(12) United States Patent
Gibble et al.

(10) Patent No.: US 6,938,120 B2
(45) Date of Patent: Aug. 30, 2005

(54) APPARATUS AND METHOD TO FORM ONE OR MORE PREMIGRATION AGGREGATES COMPRISING A PLURALITY OF LEAST RECENTLY ACCESSED VIRTUAL VOLUMES

(75) Inventors: Kevin L. Gibble, Tucson, AZ (US); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 10/230,684

(22) Filed: Aug. 29, 2002

(65) Prior Publication Data

US 2004/0044844 A1 Mar. 4, 2004

(51) Int. Cl.⁷ .............................................. G06F 12/00
(52) U.S. Cl. ...................... 711/112; 711/111; 711/161
(58) Field of Search ........................ 711/111, 112, 161, 711/162

(56) References Cited

U.S. PATENT DOCUMENTS

| | | | | |
|---|---|---|---|---|
| 4,636,946 A | | 1/1987 | Hartung et al. ............. 364/200 |
| 4,876,662 A | | 10/1989 | Pence ......................... 364/900 |
| 5,193,171 A | * | 3/1993 | Shinmura et al. ........... 711/113 |
| 5,276,867 A | * | 1/1994 | Kenley et al. .............. 707/204 |
| 5,491,810 A | | 2/1996 | Allen .......................... 395/444 |
| 5,493,663 A | | 2/1996 | Parikh ......................... 395/486 |
| 5,542,066 A | | 7/1996 | Mattson et al. ............. 395/463 |
| 5,664,187 A | | 9/1997 | Burkes et al. .............. 395/463 |
| 5,745,778 A | | 4/1998 | Alfieri ................... 395/800.01 |
| 5,784,698 A | | 7/1998 | Brady et al. ................ 711/171 |
| 5,875,454 A | | 2/1999 | Craft et al. ................. 711/113 |
| 6,012,126 A | | 1/2000 | Aggarwal et al. .......... 711/133 |
| 6,067,599 A | * | 5/2000 | Kishi et al. ................. 711/113 |
| 6,067,608 A | | 5/2000 | Perry .......................... 711/203 |
| RE36,989 E | * | 12/2000 | White ......................... 711/118 |
| 6,266,742 B1 | | 7/2001 | Challenger et al. ......... 711/133 |
| 6,269,423 B1 | | 7/2001 | Kishi .......................... 711/113 |
| 6,529,996 B1 | * | 3/2003 | Nguyen et al. ............. 711/114 |
| 6,742,084 B1 | * | 5/2004 | Defouw et al. ............. 711/133 |
| 6,816,957 B1 | * | 11/2004 | Halladay et al. ............ 711/170 |
| 2001/0054133 A1 | | 12/2001 | Murotani et al. ........... 711/114 |
| 2002/0103969 A1 | * | 8/2002 | Koizumi et al. ............ 711/114 |
| 2003/0140209 A1 | * | 7/2003 | Testardi ...................... 711/203 |
| 2003/0236942 A1 | * | 12/2003 | Kishi et al. ................. 711/113 |

* cited by examiner

Primary Examiner—Matthew Kim
Assistant Examiner—Woo H. Choi
(74) Attorney, Agent, or Firm—Dale F. Regelman

(57) ABSTRACT

A method to form one or more premigration aggregates comprising a plurality of least recently accessed virtual volumes disposed in an information storage medium. The method determines the number (R) of virtual volumes to remove from the information storage medium, selects the (R) least recently accessed virtual volumes, forms one or more premigration aggregates comprising those least recently accessed virtual volumes, and assigns each of the (R) selected virtual volumes to one of those premigration aggregates. The method establishes a minimum transfer size and determines if any of the premigration aggregates are larger than that minimum transfer size. The method writes to one or more physical volumes each of the premigrate aggregates that are larger than the minimum transfer size. Thereafter, the method removes from the information storage medium each of the premigration aggregates written to physical volumes.

30 Claims, 8 Drawing Sheets

US 6,938,120 B2

APPARATUS AND METHOD TO FORM ONE OR MORE PREMIGRATION AGGREGATES COMPRISING A PLURALITY OF LEAST RECENTLY ACCESSED VIRTUAL VOLUMES

FIELD OF THE INVENTION

Applicant's invention relates to an apparatus and method to maintain computer files in one or more virtual volume aggregates, where each of those virtual volume aggregates includes a plurality of individual virtual volumes.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes an apparatus and a method to form one or more premigration aggregates comprising one or more least recently used virtual volumes disposed in an information storage medium. In certain embodiments, that information storage medium is disposed in a virtual tape system. In certain embodiments, the information storage medium comprises a direct access storage device file buffer (DASD).

Periodically, Applicants' method determines the number (R) of virtual volumes to remove from the information storage medium. Applicants' method then selects the (R) least recently accessed virtual volumes, forms one or more premigration aggregates comprising those least recently accessed virtual volumes, and assigns each of the (R) selected virtual volumes to one of those premigration aggregates.

Applicants' method establishes a minimum transfer size and determines if any of the premigration aggregates are larger than that minimum transfer size. Applicants' method writes to one or more physical volumes one or more of the premigration aggregates that are larger than the minimum transfer size. Thereafter, Applicants' method removes from the information storage medium each of the premigration aggregates written to physical volumes.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
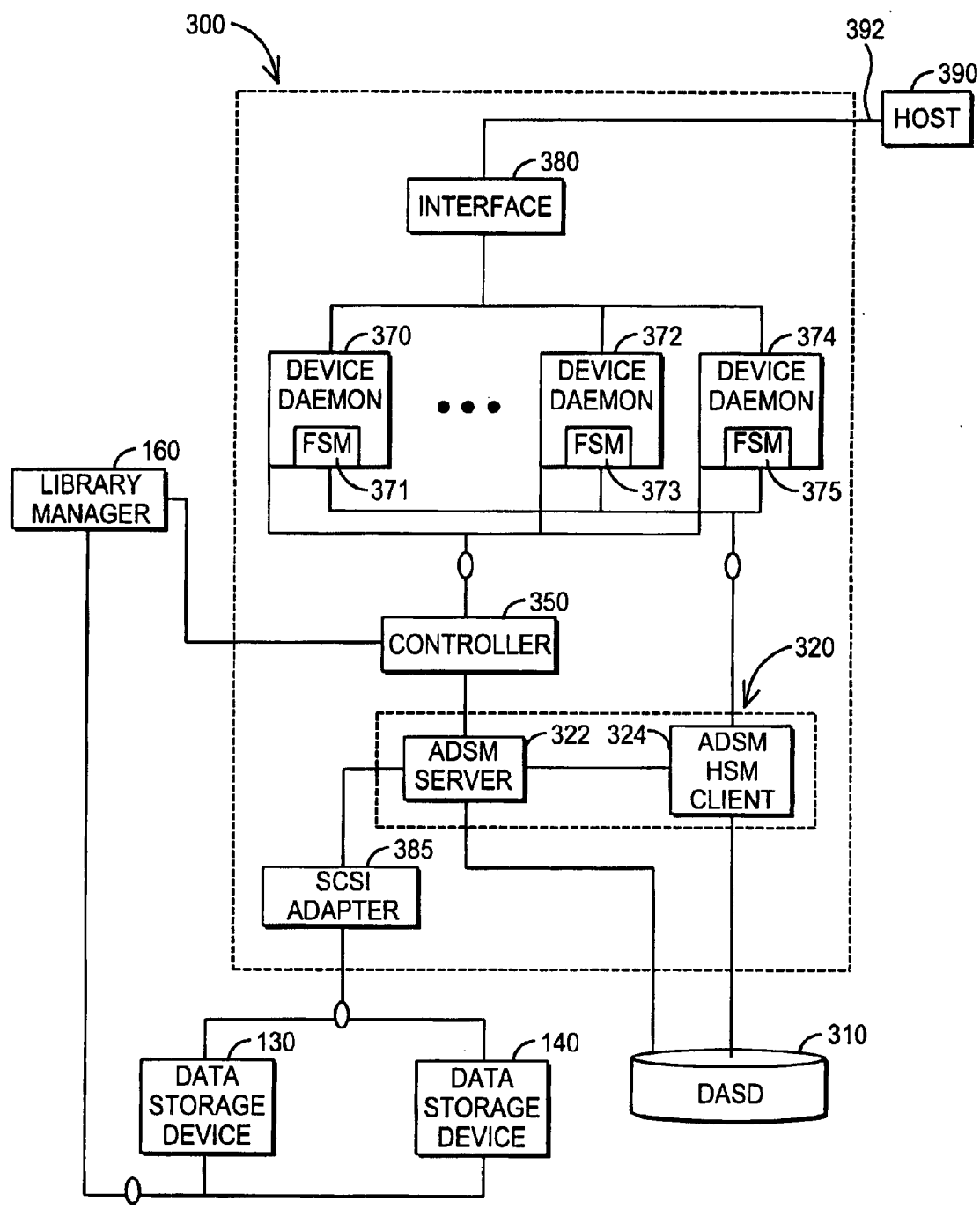
FIG. 3 is a block diagram showing the components of Applicants' virtual tape server.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
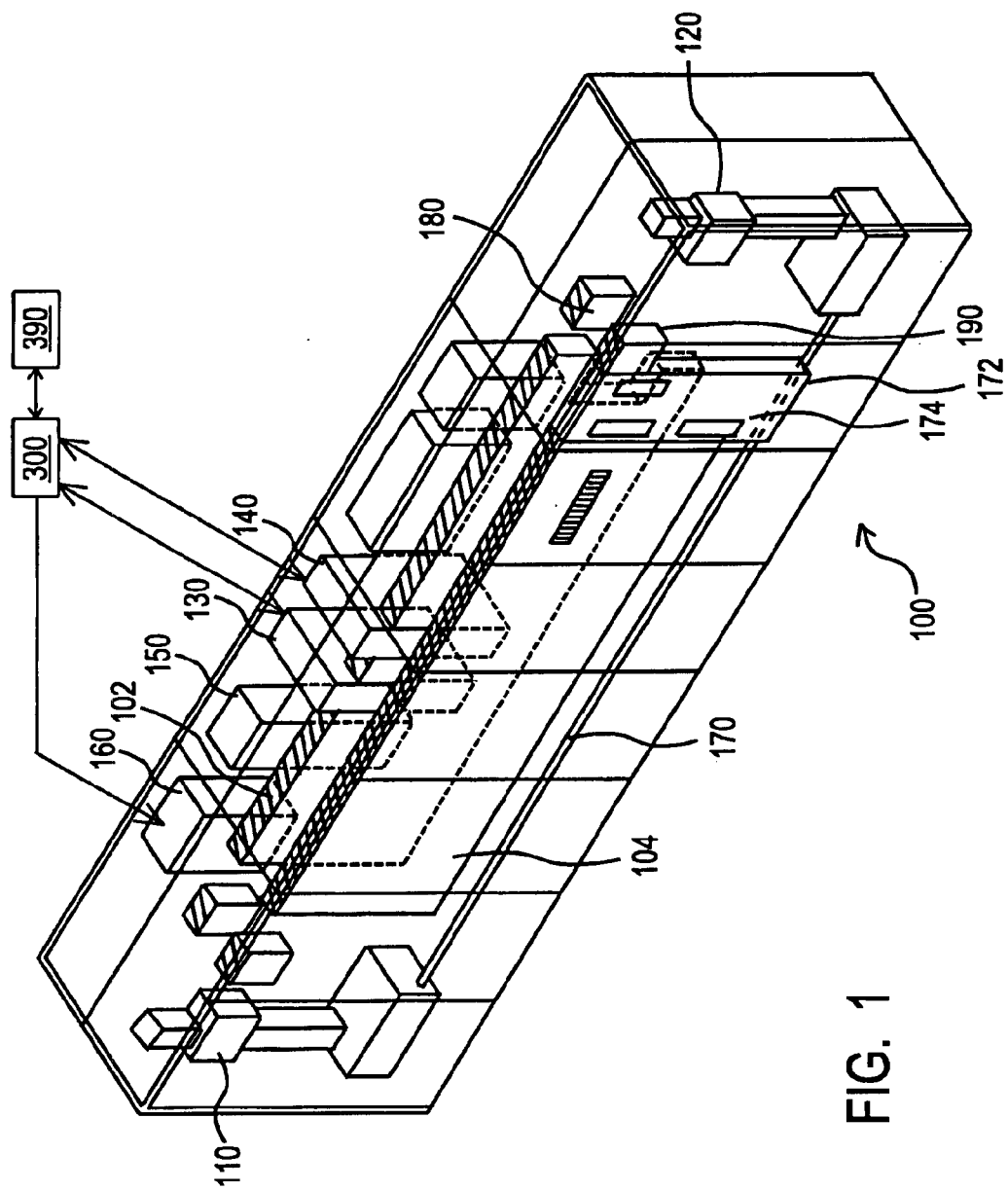
FIG. 1 is a perspective view of a first embodiment of Applicant's data storage and retrieval system.
Figure 2:
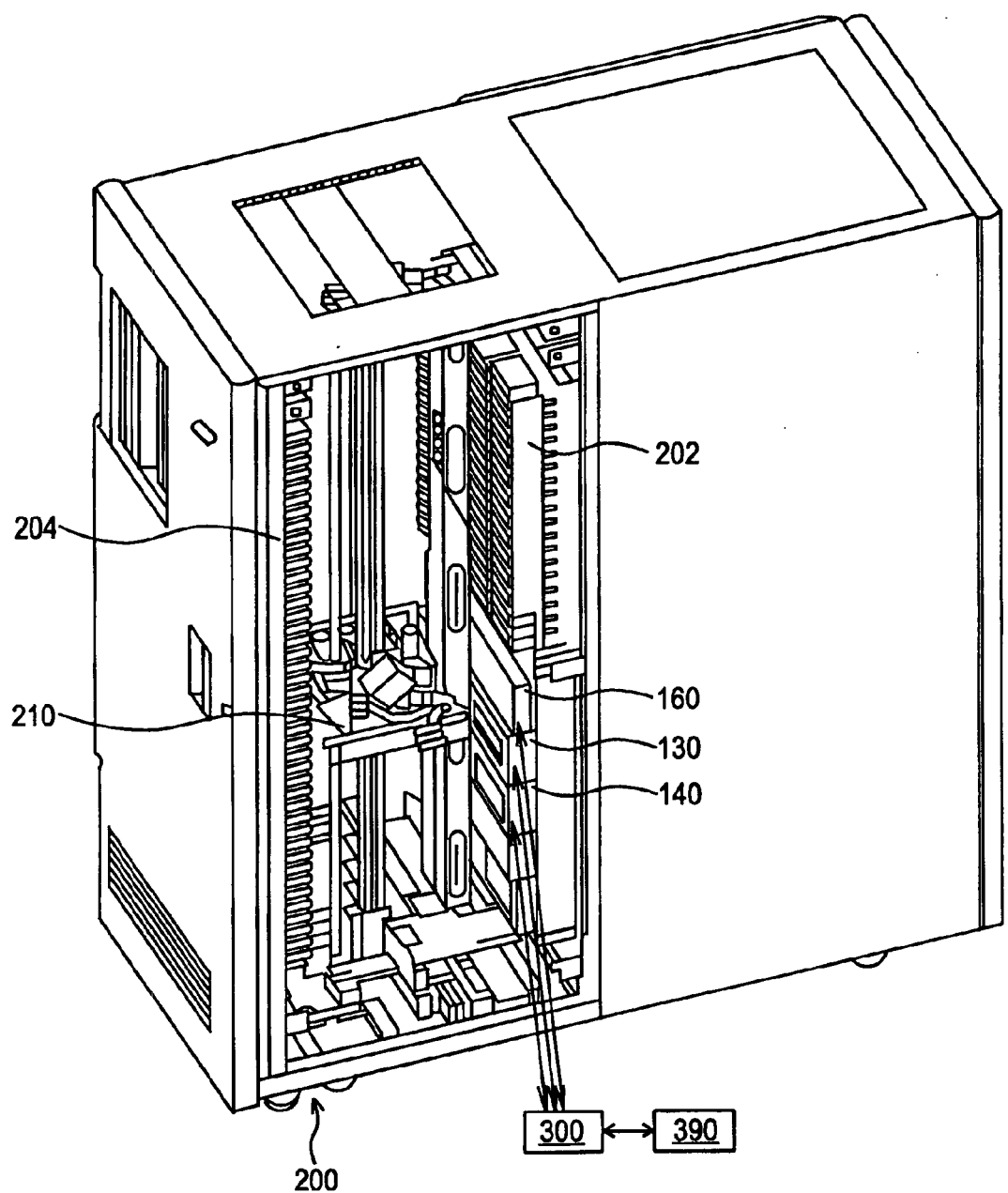
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Referring again to FIG. 3, virtual volumes that are frequently accessed by host 390 are maintained in DASD 310. Therefore, at any given time a plurality of virtual volumes are stored in DASD 310. Virtual volumes that are less frequently accessed may be written to one or more second information storage media using data storage devices 130/140. Such second information storage media include magnetic storage media, optical storage media, electronic storage media, and combinations thereof.

Figure 6:
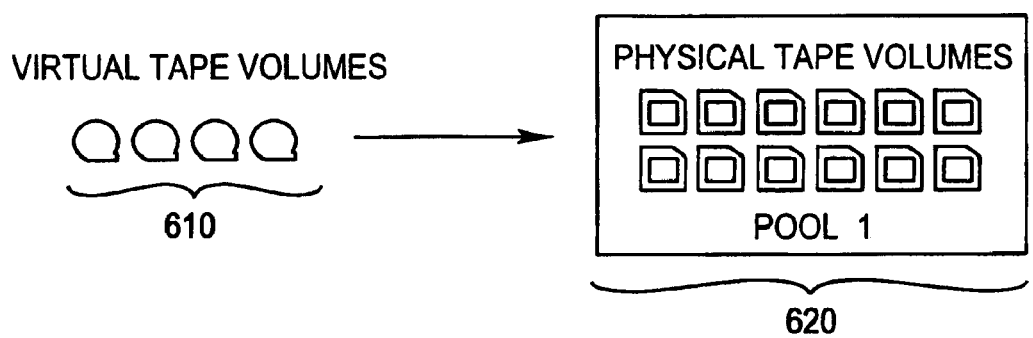
FIG. 6 is a block diagram depicting prior art methods to write a plurality of virtual volumes to a plurality of physical volumes.

Referring now to FIG. 6, using prior art methods the plurality of virtual volumes 610 stored in DASD 310 (FIG.

3) are written to plurality of second information storage media 620, where that plurality of second information storage media 620 comprise a single "pool" of media. By single "pool," Applicants mean that even though each of the identical physical volumes comprising pool 620 include an individual volume serial number, i.e. a volser, those individual physical volumes do not otherwise comprise two or more differentiated aggregate groupings.

Using Applicants' method, the plurality of virtual volumes 610 are each assigned to one of (M) virtual volume aggregates. For example and referring to FIG. 7 where (M) equals 4, the plurality of virtual volumes 610 includes a first virtual volume aggregate 710, a second virtual volume aggregate 730, a third virtual volume aggregate 750, and a fourth virtual volume aggregate 770.

The individual virtual volumes comprising virtual volume aggregate 710 may comprise a first type of data file, and the individual virtual volumes comprising virtual volume aggregate 730 may comprise a second type of data file, and the individual virtual volumes comprising virtual volume aggregate 750 may comprise a third type of data file, and the individual virtual volumes comprising virtual volume aggregate 770 may comprise a fourth type of data file. Alternatively, the individual virtual volumes comprising virtual volume aggregate 710 may comprise a first customer's data, and the individual virtual volumes comprising virtual volume aggregate 730 may comprise a second customer's data, and the individual virtual volumes comprising virtual volume aggregate 750 may comprise a third customer's data, and the individual virtual volumes comprising virtual volume aggregate 770 may comprise a fourth customer's data.

Figure 7:
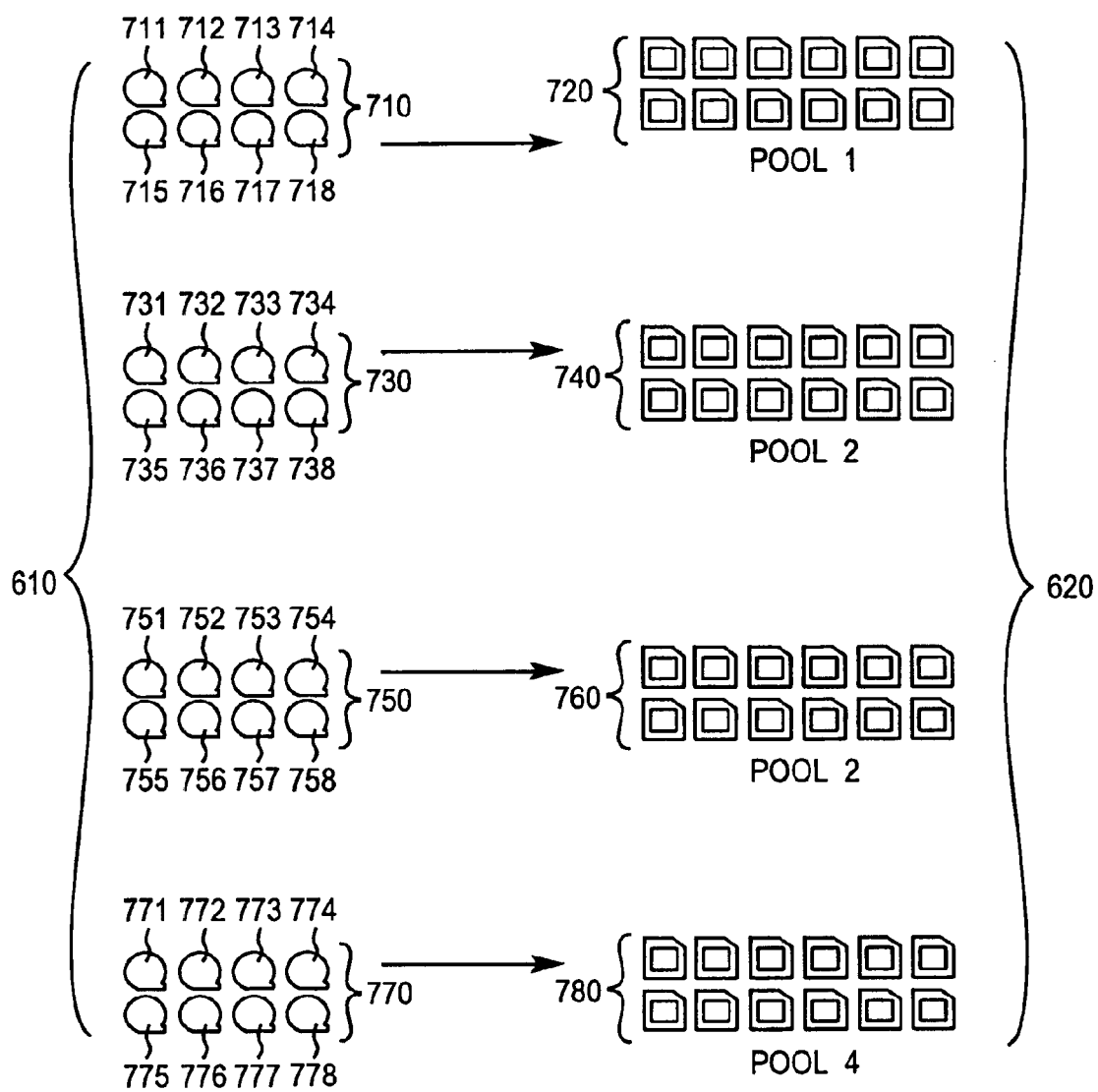
FIG. 7 is a block diagram showing Applicants' method to write four virtual volume aggregates comprising a plurality of individual virtual volumes to a plurality of physical volume pools.

Again using Applicants' method, in the embodiment of FIG. 7 the plurality of physical volumes 620 includes a first physical volume pool 720, a second physical volume pool 740, a third physical volume pool 760, and a fourth physical volume pool 780. In certain embodiments, physical volume pool 720 comprises a first information storage media, physical volume pool 740 comprises a second information storage media, physical volume pool 760 comprises a third information storage media, and physical volume pool 780 comprises a fourth information storage media.

Figure 4:
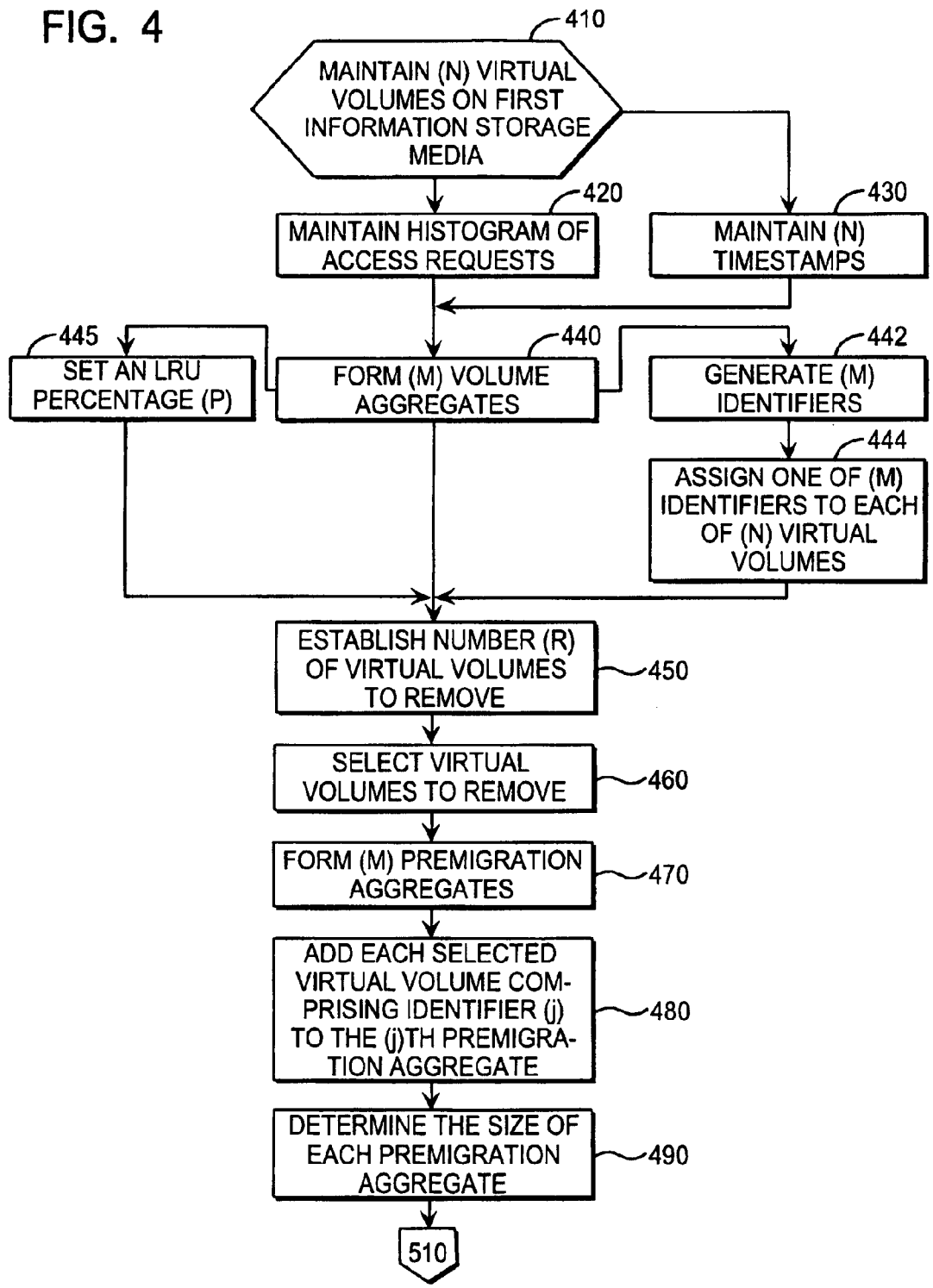
FIG. 4 is a flow chart summarizing the initial steps in Applicants' method.

FIG. 4 summarizes the initial steps in Applicants' method to form and write one or more premigration aggregates comprising one or more least recently used virtual volumes. Referring now to FIGS. 4 and 7, in step 410 Applicants' method maintains (N) virtual volumes on one or more first information storage media. In the embodiment of FIG. 7, plurality of virtual volumes 610 comprises the (N) virtual volumes of step 410. In certain embodiments, such one or more information storage media include DASD 310 (FIG. 3).

Certain embodiments of Applicants' method include step 420 wherein Applicants' method maintains a histogram for the (N) virtual volumes, where that histogram indicates the time each virtual volume was last accessed. Certain embodiments of Applicants' method include step 430 wherein Applicants' method maintains (N) timestamps for the (N) virtual volumes, where the (i)th timestamp comprises the time the (i)th virtual volume was last accessed. The virtual volume having the earliest timestamp comprises what is sometimes called the least recently used ("LRU") virtual volume.

In step 440, Applicants' method forms (M) virtual volume aggregates, where (M) is greater than or equal to 2. In certain embodiments, (M) is greater than 10. In certain embodiments, (M) is greater than 20. In certain embodiments, (M) is greater than 30. In certain embodiments, (M) is 34.

In certain embodiments, step 440 further includes step 442 wherein Applicants' method selects (M) identifiers, and step 444 wherein Applicants' method assigns one of the (M) identifiers to each of the (N) virtual volumes. In these embodiments, each virtual volume is assigned an identifier (j), where (j) is greater than or equal to 1 and less than or equal to (M). For example, in the embodiment of FIG. 7, (M) equals 4. Therefore, in the embodiment of FIG. 7, (j) is selected from the group comprising "1", "2", "3", and "4". Thus in the embodiment of FIG. 7, the (i)th virtual volume, where (i) is 711 through 718, are assigned the identifier (j), where (j) is "1." Virtual volumes 711, 712, 713, 714, 715, 716, 717, and 718 comprise the (j)th virtual volume aggregate, where (j) is 1. Using Applicants' method, virtual volumes 711, 712, 713, 714, 715, 716, 717, and/or 718, are written to physical volumes also assigned identifier "1". In the embodiment of FIG. 7, plurality of physical volumes 720 comprise the (j)th physical volume pool, where (j) is "1".

In the embodiment of FIG. 7, the (i)th virtual volume, where (i) is 731 through 738, are assigned the identifier (j), where (j) is "2." Virtual volumes 731, 732, 733, 734, 735, 736, 737, and 738 comprise the (j)th virtual volume aggregate, where (j) is 2. Using Applicants' method, virtual volumes 731, 732, 733, 734, 735, 736, 737, and/or 738, are written to physical volumes also assigned identifier "2". In the embodiment of FIG. 7, plurality of physical volumes 740 comprise the (j)th physical volume pool, where (j) is "2".

In the embodiment of FIG. 7, the (i)th virtual volume, where (i) is 751 through 758, are assigned the identifier (j), where (j) is "3." Virtual volumes 751, 752, 753, 754, 755, 756, 757, and 758 comprise the (j)th virtual volume aggregate, where (j) is 3. Using Applicants' method, virtual volumes 751, 752, 753, 754, 755, 756, 757, and/or 758, are written to physical volumes also assigned identifier "3". In the embodiment of FIG. 7, plurality of physical volumes 760 comprise the (j)th physical volume pool, where (j) is "3".

In the embodiment of FIG. 7, the (i)th virtual volume, where (i) is 771 through 778, are assigned the identifier (j), where (j) is "4." Virtual volumes 771, 772, 773, 774, 775, 776, 777, and 778 comprise the (j)th virtual volume aggregate, where (j) is 4. Using Applicants' method, virtual volumes 771, 772, 773, 774, 775, 776, 777, and/or 778, are written to physical volumes also assigned identifier "4". In the embodiment of FIG. 7, plurality of physical volumes 780 comprise the (j)th physical volume pool, where (j) is "4".

Periodically, one or more virtual volumes that have not been recently used are removed from the first information storage medium. In step 450, Applicants' method establishes the number (R) of virtual volumes to remove from the first information storage medium. In certain embodiments, Applicants' method establishes (R) based upon the quantity of information to remove from the first information storage medium.

In certain embodiments, Applicants' method includes step 445. In certain embodiments, Applicants' method includes steps 442, 444, and 445. In step 445, Applicants' method establishes an LRU percentage (P), where (P) defines the percentage of the (N) virtual volumes to remove from DASD 310. In certain embodiments, Applicants' method sets (P) to about 10%. In certain embodiments, Applicants' method sets (P) to about 20%. In certain embodiments, Applicants' method sets (P) to about 30%. In certain embodiments, Applicants' method sets (P) to about 50%. In certain embodiments, Applicants' method sets (P) to about 90%. In the embodiments which include step 455, step 450 includes calculating the (R) using equation (1).

$$(R)=[(P)/100\times(N)] \quad (1)$$

After determining in step 450 the number of virtual volumes to remove from the DASD, Applicants' method in step 460 selects the virtual volumes to remove. In certain embodiments, Applicants' method uses the histogram of step 420 to select the (R) virtual volumes that were least recently accessed. In certain embodiments, Applicants' method uses the timestamps of step 430 to select the (R) virtual volumes that were least recently accessed.

In step 470, Applicants' method forms (M) premigration aggregates, and assigns a different one of the (M) identifiers of step 442 to each of the premigration aggregates. In step 480, Applicants' method adds each selected virtual volume assigned the identifier (j) to the premigration aggregate assigned the identifier (j).

In step 490, Applicants' method determines the size of each of the (M) premigration aggregates. In certain embodiments, the size of a premigration aggregate equals the number of virtual volume comprising that aggregate. In other embodiments, the size of a premigration aggregate equals the megabytes of information comprising that premigration aggregate.

Figure 8:
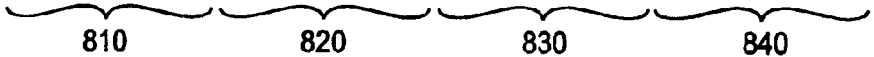
FIG. 8 shows a least recently used ("LRU") histogram for the plurality of virtual volumes of FIG. 7.

For example and referring to FIGS. 4, and 8, FIG. 8, if, for example, (P) is set to 12.5% in step 445, then in the embodiment of FIG. 8 Applicants' method sets (R) equals to 4 in step 450. Thereafter in step 460, Applicants' method selects virtual volumes 711, 731, 751, and 771, for removal from DASD 310 (FIG. 3). If, on the other hand, (P) is set to 40% in step 455, then virtual volumes 711, 731, 732, 733, 734, 751, 752, 753, 754, 771, 772, 773, and 774, are selected for removal in step 460.

Figure 5:
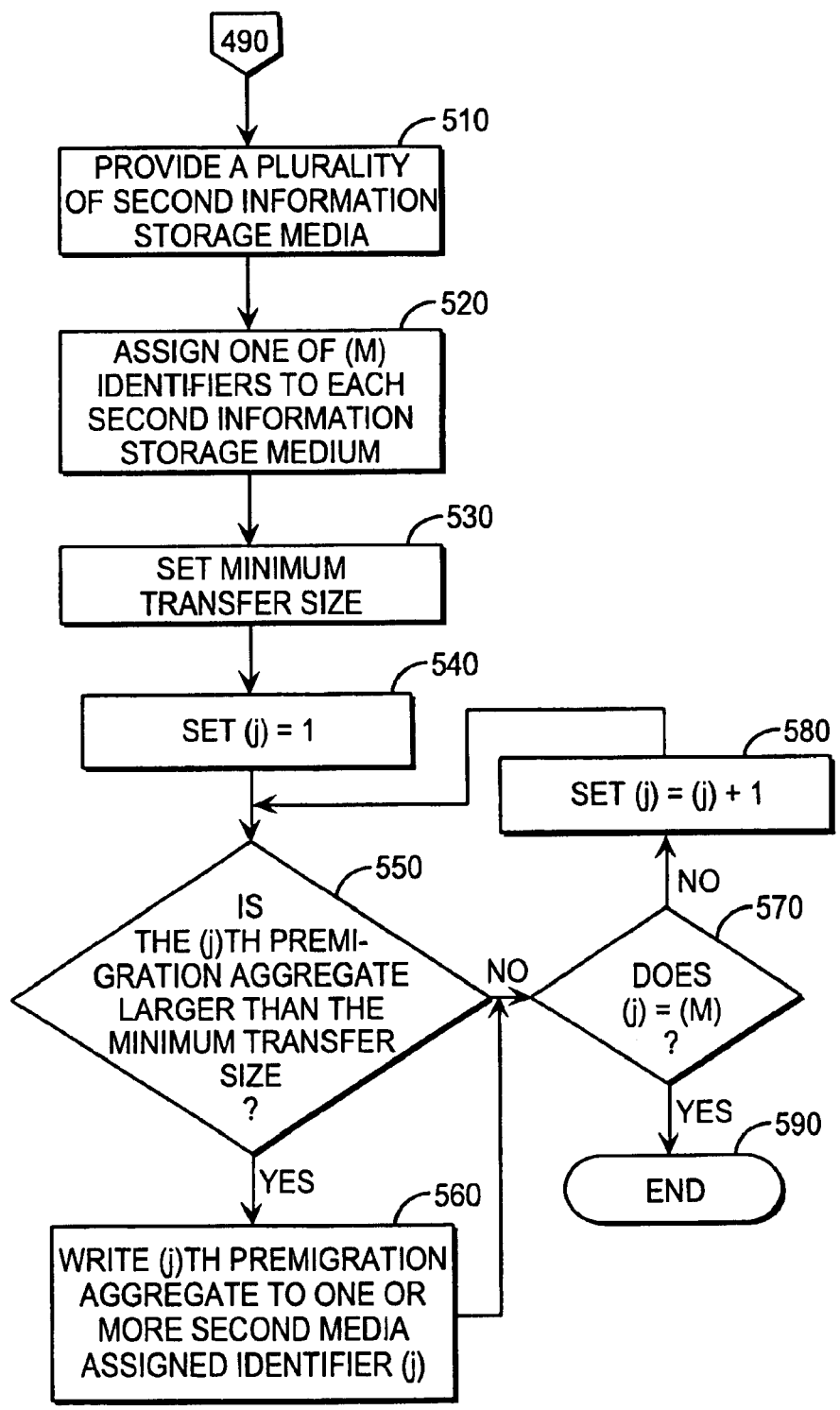
FIG. 5 is a flow chart summarizing additional steps in Applicants' method.

Referring now to FIG. 5, in step 510 Applicants' method provides a plurality of second information storage media. In certain embodiments, such second information storage media include magnetic storage media such as magnetic disks, magnetic tapes, and the like. In certain embodiments, such second information storage media include optical storage media such as CD/DVD-ROM media, CD/DVD-WORM media, CD/DVD-RW media, and the like. In certain embodiments, such second information storage media include electronic storage media including a device such as a PROM, EPROM, EEPROM, Flash PROM, compactflash, smartmedia, and the like. In step 520, Applicants' method assigns one of the (M) identifiers of step 422 to each of the plurality of second information storage media.

Virtual volumes infrequently used are removed from the first information storage medium, i.e. DASD 310, to make room for newer files which will be accessed frequently. Using Applicants' method, prior to removing the (R) lest recently used virtual volumes from DASD 310, those virtual volumes are written to physical volumes, i.e. premigrated, as aggregates. The selected virtual volumes comprising identifier (j) are written to physical volumes also assigned the identifier (j). Applicants have found it time inefficient, however, to premigrate and remove relatively small virtual volume aggregates. Therefore, in step 530 Applicants' method sets a minimum transfer size.

In certain embodiments, Applicants' minimum transfer size comprises a minimum "chain length," i.e. the premigration aggregate must include a minimum number of individual virtual volumes. In certain of these embodiments, the minimum number of virtual volumes is set in step 530 to about 10. In certain of these embodiments, the minimum number of virtual volumes is set in step 530 to about 100. In certain of these embodiments, the minimum number of virtual volumes is set in step 530 to about 1000.

In certain embodiments, Applicants' minimum transfer size comprises a minimum number of bytes. In certain of these embodiments, the minimum transfer size is set in step 530 to about 100 megabytes. In certain of these embodiments, the minimum premigration virtual volume aggregate size is set in step 530 to about 100 gigabytes.

In certain embodiments, Applicants' minimum transfer size comprises both a minimum number of individual virtual volumes and a minimum number of bytes. In certain of these embodiments, the minimum transfer size is set in step 530 to comprise about 10 virtual volumes and about 100 megabytes. In certain of these embodiments, the minimum transfer size is set in step 530 to comprise about 10,000 virtual volumes and about 10,000 gigabytes.

In step 540, Applicants' method sequentially selects one of the (M) premigration aggregates starting with the first premigration aggregate. In step 550, Applicants' method determines if the premigration aggregate selected in step 540 is larger than the minimum transfer size. If Applicants' method determines in step 550 that the selected premigration aggregate is not larger than the minimum transfer size, then Applicants' method transitions from step 550 to step 570.

Alternatively, if Applicants' method determines in step 550 that the selected premigration aggregate is larger than the minimum transfer size, then Applicants' method transitions from step 550 to step 560 wherein Applicants' method writes that premigration aggregate to one or more second information storage media comprising the (j)th identifier. Applicants' method transitions from step 560 to step 570 wherein Applicants' method determines if (j)=(M), i.e. if all the premigration aggregates have been examined. If Applicants' method determines in step 570 that (j)=(M), then Applicants' method transitions from step 570 to step 590 and ends.

Alternatively, if Applicants' method determines in step 570 that (j) does not equal (M), then Applicants' method transitions from step 570 to step 580 wherein (j) is incremented. Applicants' method transitions from step 580 to step 550 and continues.

In certain embodiments, the individual steps recited in FIGS. 4 and/or 5 may be combined, eliminated, or reordered.

Applicants' invention includes an article of manufacture comprising a computer useable medium having computer readable program code disposed therein for forming one or more premigration aggregates, where each of those one or more premigration aggregates comprises one or more individual virtual volumes. Applicants' invention further includes computer program products embodied as program code stored in one or more memory devices, such as a magnetic disk, a magnetic tape, to form one or more premigration aggregates, where each of those one or more premigration aggregates comprises one or more individual virtual volumes.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to form one or more premigration aggregates comprising a plurality of least recently accessed virtual volumes, comprising the steps of:

maintaining (N) virtual volumes in an information storage medium;

determining the number (R) of said plurality of virtual volumes to remove from said information storage medium wherein R is greater than 1;

selecting the (R) least recently accessed virtual volumes;

forming one or more premigration aggregates;

assigning each of said (R) selected virtual volumes to one of said one or more premigration aggregates;

establishing a minimum total aggregate transfer size;

determining if any of said one more or premigration aggregates are larger than said minimum total aggregate transfer size;

operative for each of said premigration aggregates that are larger than said minimum total aggregate transfer size:

writing that premigration aggregate to one or more physical volumes; and removing that premigration aggregate from said information storage medium.

2. The method of claim 1, further comprising the steps of:

maintaining (N) timestamps, wherein each of said (N) timestamps indicates the last time a different one of said (N) virtual volumes was last accessed; and selecting said (R) virtual volumes based upon said (N) timestamps.

3. The method of claim 1, further comprising the steps of:

maintaining a histogram, wherein said histogram indicates the time each of said (N) virtual volumes was last accessed; and selecting said (R) virtual volumes based upon said histogram.

4. The method of claim 1, further comprising the steps of:

establishing an LRU percentage (P); and calculating (R), wherein (R) equals the multiplication product of (P)/100 and (N).

5. The method of claim 1, further comprising the steps of:

selecting (M) identifiers, wherein (M) is greater than or equal to 2;

assigning each of said (N) virtual volumes one of said identifiers;

assigning each of said one or more premigration aggregates a different one of said (M) identifiers; and for each value of (j), adding each selected virtual volume assigned the identifier (j) to the premigration aggregate assigned the identifier (j), wherein (j) is greater than or equal to 1 and less than or equal to (M).

6. The method of claim 5, further comprising the steps of:

assigning one of said (M) identifiers to each of said plurality of second information storage media;

operative if said premigration aggregate assigned the identifier (j) is larger than said minimum transfer size, writing that premigration aggregate to one or more of said plurality of second information storage media assigned identifier (j).

7. The method of claim 1, further comprising the step of setting the value for said minimum transfer size to be greater than about 100 megabytes.

8. The method of claim 7, further comprising the step of setting the value for said minimum virtual volume aggregate size to be greater than about 100 gigabytes.

9. The method of claim 1, further comprising the step of setting said minimum premigration transfer size to be greater than about 10 virtual volumes.

10. A method to form one or more premigration aggregates comprising a plurality of least recently accessed virtual volumes, comprising the steps of:

maintaining (N) virtual volumes;

selecting (M) identifiers, where (M) is greater than or equal to 2;

assigning one of said (M) identifiers to each of said (N) virtual volumes, such that the (i)th virtual volume comprises a virtual volume identifier (j), wherein (j) is greater than or equal to 1 and less than or equal to (M);

maintaining (N) timestamps, wherein the (i)th timestamp comprises the last time the (i)th virtual volume was accessed;

establishing an LRU percentage (P), wherein (P) is greater than or equal to about 10% and less than or equal to about 90%;

calculating the number (R) of virtual volumes to remove from said information storage medium, wherein (R) equals the multiplication product of (P)/100 and (N);

selecting the (R) least recently accessed virtual volumes using said (N) timestamps;

forming (M) premigration virtual volume aggregates, wherein the premigration virtual volume aggregate assigned the identifier (j) comprises each selected virtual volume assigned the identifier (j);

providing a plurality of physical volumes;

assigning one of said (M) identifiers to each of said plurality of physical volumes;

establishing a minimum transfer size;

determining, for each value of (j), if the premigration aggregate assigned identifier (j) is larger than said minimum transfer size;

operative if the premigration aggregate assigned the identifier (j) is larger than said minimum transfer size, writing that premigration aggregate to one or more of said physical volumes assigned the identifier (j).

11. An article of manufacture comprising a computer useable medium having computer readable program code disposed to form one or more premigration aggregates comprising a plurality of least recently accessed virtual volumes, the computer readable program code comprising a series of computer readable program steps to effect:

maintaining (N) virtual volumes in an information storage medium;

establishing the number (R) of said plurality of virtual volumes to remove from said information storage medium wherein R is greater than 1;

selecting the (R) least recently accessed virtual volumes;

forming one or more premigration aggregates;

assigning each of said (R) selected virtual volumes to one of said one or more premigration aggregates;

determining a minimum total aggregate transfer size;

determining if any of said one or more premigration aggregates are larger than said minimum total aggregate transfer size;

operative for each of said premigration aggregates that are larger than said minimum total aggregate transfer size:

writing that premigration aggregate to one or more physical volumes; and removing that premigration aggregate from said information storage medium.

12. The article of manufacture of claim 11, wherein said computer readable program code further comprises a series of computer readable program steps to effect:

maintaining (N) timestamps, wherein each of said (N) timestamps indicates the last time a different one of said (N) virtual volumes was last accessed; and selecting said (R) virtual volumes based upon said (N) timestamps.

13. The article of manufacture of claim 11, wherein said computer readable program code further comprises a series of computer readable program steps to effect:

maintaining a histogram, wherein said histogram indicates the time each of said (N) virtual volumes was last accessed; and selecting said (R) virtual volumes based upon said histogram.

14. The article of manufacture of claim 11, wherein said computer readable program code further comprises a series of computer readable program steps to effect:

establishing an LRU percentage (P); and calculating (R), wherein (R) equals the multiplication product of (P)/100 and (N).

15. The article of manufacture of claim 11, wherein said computer readable program code further comprises a series of computer readable program steps to effect:

selecting (M) identifiers, wherein (M) is greater than or equal to 2;

assigning each of said (N) virtual volumes one of said identifiers;

assigning each of said one or more premigration aggregates a different one of said (M) identifiers; and for each value of (j), adding each selected virtual volume assigned the identifier (j) to the premigration aggregate assigned the identifier (j), wherein (j) is greater than or equal to 1 and less than or equal to (M).

16. The article of manufacture of claim 15, wherein said computer readable program code further comprises a series of computer readable program steps to effect:

assigning one of said (M) identifiers to each of said plurality of second information storage media;

operative if said premigration aggregate assigned identifier (j) is larger than said minimum transfer size, writing that premigration aggregate to one or more of said plurality of second information storage media assigned identifier (j).

17. The article of manufacture of claim 11, wherein said computer readable program code further comprises a series of computer readable program steps to effect setting the value for said minimum transfer size to be greater than about 100 megabytes.

18. The article of manufacture of claim 17, wherein said computer readable program code further comprises a series of computer readable program steps to effect setting the value for said minimum virtual volume aggregate size to be greater than about 100 gigabytes.

19. The article of manufacture of claim 11, wherein said computer readable program code further comprises a series of computer readable program steps to effect setting said minimum premigration transfer size to be greater than about 10 virtual volumes.

20. An article of manufacture comprising a computer useable medium having computer readable program code disposed therein to form one or more premigration aggregates comprising a plurality of least recently accessed virtual volumes, the computer readable program code comprising a series of computer readable program steps to effect:

maintaining (N) virtual volumes;

selecting (M) identifiers, where (M) is greater than or equal to 2;

assigning one of said (M) identifiers to each of said (N) virtual volumes, such that the (i)th virtual volume comprises a virtual volume identifier (j), wherein (j) is greater than or equal to 1 and less than or equal to (M);

maintaining (N) timestamps, wherein the (i)th timestamp comprises the last time the (i)th virtual volume was accessed;

establishing an LRU percentage (P), wherein (P) is greater than or equal to about 10% and less than or equal to about 90%;

calculating the number (R) of virtual volumes to remove from said information storage medium, wherein (R) equals the multiplication product of (P)/100 and (N);

selecting the (R) least recently accessed virtual volumes using said (N) timestamps;

forming (M) premigration virtual volume aggregates, wherein the premigration aggregate assigned the identifier (j) comprises each selected virtual volume assigned the identifier (j);

providing a plurality of physical volumes;

assigning one of said (M) identifiers to each of said plurality of physical volumes;

establishing a minimum transfer aggregate size;

determining, for each value of (j), if the premigration aggregate assigned the identifier (j) is larger than said minimum transfer size;

operative if the premigration aggregate assigned the identifier (j) is larger than said minimum transfer size, writing that premigration aggregate to one or more of said physical volumes assigned the identifier (j).

21. A computer program product usable with a programmable computer processor having computer readable program code embodied therein to form one or more premigration aggregates comprising a plurality of least recently accessed virtual volumes, comprising:

computer readable program code which causes said programmable computer processor to maintain (N) virtual volumes in an information storage medium;

computer readable program code which causes said programmable computer processor to determine the number (R) of said plurality of virtual volumes to remove from said information storage medium wherein R is greater than 1;

computer readable program code which causes said programmable computer processor to select the (R) least recently accessed virtual volumes;

computer readable program code which causes said programmable computer processor to form one or more premigration aggregates;

computer readable program code which causes said programmable computer processor to assign each of said (R) selected virtual volumes to one of said one or more premigration aggregates;

computer readable program code which causes said programmable computer processor to establish a minimum total aggregate transfer size;

computer readable program code which causes said programmable computer processor to determine if any of said one or more premigration aggregates are larger than said minimum total aggregate transfer size;

computer readable program code which, for each of said premigration aggregates that are larger than said minimum total aggregate transfer size, causes said programmable computer processor to write that premigration aggregate to one or more physical volumes and to remove that premigration aggregate from said information storage medium.

22. The computer program product of claim 21, further comprising:
computer readable program code which causes said programmable computer processor to maintain (N) timestamps, wherein each of said (N) timestamps indicates the last time a different one of said (N) virtual volumes was last accessed; and
computer readable program code which causes said programmable computer processor to select said (R) virtual volumes based upon said (N) timestamps selecting said (R) virtual volumes based upon said (N) timestamps.

23. The computer program product of claim 21, further comprising:
computer readable program code which causes said programmable computer processor to maintain a histogram, wherein said histogram indicates the time each of said (N) virtual volumes was last accessed; and
computer readable program code which causes said programmable computer processor to select said (R) virtual volumes based upon said histogram.

24. The computer program product of claim 21, further comprising:
computer readable program code which causes said programmable computer processor to establish an LRU percentage (P); and
computer readable program code which causes said programmable computer processor to calculate (R), wherein (R) equals the multiplication product of (P)/100 and (N).

25. The computer program product of claim 24, further comprising:
computer readable program code which causes said programmable computer processor to select (M) identifiers, wherein (M) is greater than or equal to 2;
computer readable program code which causes said programmable computer processor to assign each of said (N) virtual volumes one of said identifiers;
computer readable program code which causes said programmable computer processor to assign each of said one or more premigration aggregates a different one of said (M) identifiers; and
computer readable program code which causes said programmable computer processor to, for each value of (j), add each selected virtual volume assigned the identifier (j) to the premigration aggregate assigned the identifier (j), wherein (j) is greater than or equal to 1 and less than or equal to (M).

26. The computer program product of claim 25, further comprising:
computer readable program code which causes said programmable computer processor to assign one of said (M) identifiers to each of said plurality of second information storage media;
computer readable program code which, if said premigration aggregate assigned the identifier (j) is larger than said minimum transfer size, causes said programmable computer processor to write that premigration aggregate to one or more of said plurality of second information storage media assigned identifier (j).

27. The computer program product of claim 21, further comprising computer readable program code which causes said programmable computer processor to set said minimum transfer size to equal to at least about 100 megabytes.

28. The computer program product of claim 27, further comprising computer readable program code which causes said programmable computer processor to set said minimum transfer size equal to at least about 100 gigabytes.

29. The computer program product of claim 21, further comprising computer readable program code which causes said programmable computer processor to set said minimum premigration transfer size to be greater than about 10 virtual volumes.

30. A computer program product usable with a programmable computer processor having computer readable program code embodied therein to form one or more premigration aggregates comprising a plurality of least recently accessed virtual volumes, comprising:
computer readable program code which causes said programmable computer processor to maintain (N) virtual volumes;
computer readable program code which causes said programmable computer processor to select (M) identifiers, where (M) is greater than or equal to 2;
computer readable program code which causes said programmable computer processor to assign one of said (M) identifiers to each of said (N) virtual volumes, such that the (i)th virtual volume comprises a virtual volume identifier (j), wherein (j) is greater than or equal to 1 and less than or equal to (M);
computer readable program code which causes said programmable computer processor to maintain (N) timestamps, wherein the (i)th timestamp comprises the last time the (i)th virtual volume was accessed;
computer readable program code which causes said programmable computer processor to establish an LRU percentage (P), wherein (P) is greater than or equal to about 10% and less than or equal to about 90%;
computer readable program code which causes said programmable computer processor to calculate the number (R) of virtual volumes to remove from said information storage medium, wherein (R) equals the multiplication product of (P)/100 and (N);
computer readable program code which causes said programmable computer processor to select the (R) least recently accessed virtual volumes using said (N) timestamps;
computer readable program code which causes said programmable computer processor to form (M) premigration virtual volume aggregates, wherein the premigration aggregate assigned the identifier (j) comprises each selected virtual volume assigned the identifier (j);
computer readable program code which causes said programmable computer processor to assign one of said (M) identifiers to each of said plurality of physical volumes;
computer readable program code which causes said programmable computer processor to establish a minimum transfer size;
computer readable program code which causes said programmable computer processor to, for each value of (j), determine if the premigration aggregate assigned the identifier (j) is larger than said minimum transfer size;
computer readable program code which, if the premigration aggregate assigned the identifier (j) is larger than said minimum transfer size, causes said programmable computer processor to write that premigration aggregate to one or more of said physical volumes assigned the identifier (j).

* * * * *